United States Patent
Joyce, III

(10) Patent No.: US 9,673,981 B1
(45) Date of Patent: Jun. 6, 2017

(54) VERIFICATION OF AUTHENTICITY AND RESPONSIVENESS OF BIOMETRIC EVIDENCE AND/OR OTHER EVIDENCE

(71) Applicant: BiObex, LLC, Reston, VA (US)

(72) Inventor: Arthur W. Joyce, III, Vienna, VA (US)

(73) Assignee: BiObex, LLC, Reston, VA (US)

( * ) Notice: Subject to any disclaimer, the term of this patent is extended or adjusted under 35 U.S.C. 154(b) by 0 days.

(21) Appl. No.: 15/274,065

(22) Filed: Sep. 23, 2016

Related U.S. Application Data

(63) Continuation of application No. 14/845,172, filed on Sep. 3, 2015, now Pat. No. 9,455,836, which is a continuation of application No. 13/308,462, filed on Nov. 30, 2011, now Pat. No. 9,160,536.

(51) Int. Cl.
*H04L 9/32* (2006.01)
*H04L 29/06* (2006.01)
*G06F 21/00* (2013.01)
*G06F 21/32* (2013.01)
*G06Q 20/40* (2012.01)

(52) U.S. Cl.
CPC ............ *H04L 9/3231* (2013.01); *G06F 21/32* (2013.01); *G06Q 20/40145* (2013.01); *H04L 9/3236* (2013.01); *H04L 9/3247* (2013.01); *H04L 9/3263* (2013.01); *H04L 9/3268* (2013.01); *H04L 9/3271* (2013.01)

(58) Field of Classification Search
CPC .......... G06F 21/32; G06F 21/34; G06F 21/31; G06F 21/57; G06F 21/64; H04L 9/3231; H04L 63/0861
See application file for complete search history.

(56) References Cited

U.S. PATENT DOCUMENTS

| | | | | |
|---|---|---|---|---|
| 5,719,950 A * | 2/1998 | Osten | .................. | A61B 5/0205 340/5.82 |
| 6,185,316 B1 * | 2/2001 | Buffam | .................. | G06F 21/32 382/100 |
| 6,332,193 B1 * | 12/2001 | Glass | ..................... | G06F 21/32 713/170 |
| 6,453,416 B1 * | 9/2002 | Epstein | .................. | G06F 21/32 380/30 |
| 6,751,733 B1 * | 6/2004 | Nakamura | ............. | G06F 21/32 713/155 |
| 7,508,960 B1 * | 3/2009 | Bolle | ....................... | A61B 3/14 340/5.82 |
| 7,593,550 B2 * | 9/2009 | Hamza | ................. | G06K 9/0061 382/117 |

(Continued)

*Primary Examiner* — Tae Kim
(74) *Attorney, Agent, or Firm* — Sheppard Mullin Richter & Hampton LLP

(57) ABSTRACT

Authenticity and responsiveness of evidence (e.g., biometric evidence) may be validated without regard for whether there is direct control over a sensor that acquired the evidence. In some implementations, only a data block containing evidence that is (1) appended with a server-generated challenge (e.g., a nonce) and (2) signed or encrypted by the sensor may validate that the evidence is responsive to a current request and belongs to a current session. In some implementations, trust may be established and/or enhanced due to one or more security features (e.g., anti-spoofing, anti-tampering, and/or other security features) being collocated with the sensor at the actual sampling site.

20 Claims, 4 Drawing Sheets

(56) References Cited

U.S. PATENT DOCUMENTS

| | | | |
|---|---|---|---|
| 7,804,982 B2* | 9/2010 | Howard | G06F 17/30011 382/115 |
| 8,296,573 B2* | 10/2012 | Bolle | G06F 21/32 713/186 |
| 9,160,536 B2 | 10/2015 | Joyce, III | |
| 9,455,836 B1 | 9/2016 | Joyce | |
| 2002/0104006 A1* | 8/2002 | Boate | H04L 63/0853 713/186 |
| 2002/0124176 A1* | 9/2002 | Epstein | G06Q 20/341 713/186 |
| 2002/0136435 A1* | 9/2002 | Prokoski | G06K 9/00221 382/118 |
| 2002/0174344 A1* | 11/2002 | Ting | G06F 21/32 713/185 |
| 2002/0183624 A1* | 12/2002 | Rowe | A61B 5/117 600/476 |
| 2003/0123714 A1* | 7/2003 | O'Gorman | G06K 9/00899 382/124 |
| 2003/0225693 A1* | 12/2003 | Ballard | G06F 21/6245 705/42 |
| 2004/0148526 A1* | 7/2004 | Sands | G06F 21/32 726/5 |
| 2004/0250085 A1* | 12/2004 | Tattan | G06F 21/32 713/186 |
| 2005/0235148 A1* | 10/2005 | Scheidt | G06F 21/31 713/168 |
| 2005/0240779 A1* | 10/2005 | Aull | G06F 21/32 713/186 |
| 2005/0265585 A1* | 12/2005 | Rowe | G06K 9/0012 382/124 |
| 2006/0080537 A1* | 4/2006 | Yoshizaki | G06F 21/64 713/176 |
| 2006/0274921 A1* | 12/2006 | Rowe | G06K 9/00033 382/124 |
| 2006/0282680 A1* | 12/2006 | Kuhlman | G06F 21/32 713/186 |
| 2007/0036397 A1* | 2/2007 | Hamza | G06K 9/0061 382/117 |
| 2007/0140531 A1* | 6/2007 | Hamza | G06K 9/00597 382/117 |
| 2008/0098469 A1* | 4/2008 | Morijiri | H04L 9/3271 726/5 |
| 2008/0162943 A1* | 7/2008 | Ali | G07C 9/00158 713/185 |
| 2008/0209226 A1 | 8/2008 | Venkatesan | |
| 2008/0310619 A1 | 12/2008 | Scheidt | |
| 2009/0031141 A1* | 1/2009 | Pearson | G06F 21/10 713/187 |
| 2009/0037743 A1* | 2/2009 | Narayanaswami | G07C 9/00158 713/186 |
| 2009/0070593 A1* | 3/2009 | Boshra | G07C 9/00158 713/186 |
| 2009/0080717 A1 | 3/2009 | Dias | |
| 2010/0287369 A1* | 11/2010 | Monden | G06F 21/32 713/156 |
| 2012/0020535 A1* | 1/2012 | Liachenko | G06K 9/00073 382/125 |
| 2012/0253906 A1 | 10/2012 | Lapica | |
| 2013/0111222 A1 | 5/2013 | Joyce | |
| 2013/0138964 A1 | 5/2013 | Joyce | |

* cited by examiner

VERIFICATION OF AUTHENTICITY AND RESPONSIVENESS OF BIOMETRIC EVIDENCE AND/OR OTHER EVIDENCE

CROSS-REFERENCE TO RELATED APPLICATIONS

This application is a continuation of and claims the benefit of U.S. patent application Ser. No. 14/845,172, filed Sep. 3, 2015, which is a continuation of and claims the benefit of U.S. patent application Ser. No. 13/308,462, filed Nov. 30, 2011, both titled "Verification of Authenticity and Responsiveness of Biometric Evidence and/or other Evidence," the contents for each of which are incorporated herein by reference in their entirety.

FIELD OF THE INVENTION

The invention relates to establishing trust in biometric evidence and/or other evidence by verifying responsiveness and/or authenticity without regard for whether there is direct control over a sensor that acquired the evidence.

BACKGROUND

The Internet is a vast collection of interconnected computers, connected to a vast variety of resources (e.g., information, services, and data). Many of these resources are protected from unauthorized access. Numerous technologies exist around protecting resources such as firewalls, virtual private networks (VPN), application servers, cloud computing appliances, and/or other technologies.

Authorization may refer to a process of determining whether a user has a right to access a resource. Authentication may refer to a process of confirming that a user is actually is the person they claim to be. Authorization does not necessarily involve identification. However, in many forms of authorization, the user's identity is required. A common form of authentication relies on user-name and password. That is, the user claims an identity (e.g., via the user-name), and that identity is subsequently verified by matching the password that the user entered to a password previously stored in an authentication database and/or other memory. Of course, any person with knowledge of the username and password can potentially access protected resources.

Authentication can take many forms. By way of non-limiting example, forms of authentication may include something known (e.g., a secret password, your mother's birthday, and/or other knowledge), something possessed (e.g., a credit card, a cryptographic token, and/or other possessions), some physical feature (e.g., a facial feature, fingerprint, iris patterns, and/or other physical features). These items may sometimes be referred to as evidence of a claimed identity.

The term "biometric" comes from "bio," indicating a reliance on a biological feature, and "metric," which means measurement. As such, biometric literally means the measurement of a biological feature. Biometrics refers the overall field of study, industry, and use of biometric identification and/or verification. It relies on the idea that biological processes generally do not produce truly identical objects. For example, even identical twins are measurably different. By measuring a biological object with sufficient accuracy, it may therefore be possible to distinguish an individual from everyone else in the population.

Biometric verification may be called for to confirm the identity of an individual as part of the authentication process. Biometric verification may include sample acquisition, template extraction, a matching step, and/or other operations. According to some existing approaches, sample acquisition may include capturing an image and/or other sample of a feature of a person that a biometric system relies on. For instance, a fingerprint sensor may capture an image of the individual's finger. Iris recognition may begin by capturing an image(s) of a person's eye(s). Such images may require specialized conditions such as, for example, a specific light spectrum, angle of illumination, illumination intensity, projected illumination pattern, light polarization, and/or other conditions. Specialized cameras that collect biometric samples may be referred to as biometric sensors. In some existing approaches, a biometric sensor may include one or more other sensors, rather than or in addition to a camera.

Generally speaking, an extraction process may convert a biometric sample into an extracted feature set. Such a feature set may be referred to as a template. For example, a feature set may be extracted from an image of a fingerprint as minutia data, which is a list including a type, location, and orientation of individual fingerprint features within the overall fingerprint pattern. A template used for verification and/or identification may typically be extracted from a single biometric sample. A template used for enrollment may often be derived from several biometric samples and/or several biometric templates, all from the same biometric feature (e.g., the right index finger).

Existing matching processes generally may include aligning and/or comparing the extracted feature sets, typically between an enrolled exemplary template—an "exemplar"—stored in an authentication server's database, and a live biometric sample or template. The comparison may result in a score and/or other metric that represents the likelihood that the exemplar and the live biometric sample are from the same person. The biometric sample quality (e.g., image quality), biological statistics, score, and/or other factors may be combined to produce a confidence metric that the biometric sample came from the person the user claims to be.

Unfortunately, biometric features may be difficult to conceal or keep secret. For example, a biometric sample may be obtained from a latent fingerprint left on a coffee cup or a high resolution facial image. Whether used to enroll in a biometric system, or used to verify one's identity, once a biometric sample has been captured, any compromise to the security of how this data is handled may permanently place that biometric at large. Spoofing refers to the process of tricking a biometric sensor into acquiring a biometric sample from surrogate feature, prosthetic feature, and/or other non-legitimate source, rather than a real biometric feature.

In a supervised setting, it may be difficult to fake a biometric sample. For example, an individual will most likely fail to cash a check at a bank if they present someone else's driver's license as their own identification. With biometrics, a claimed identity may be verified by evidence that is merely an electronic representation of any real proof of identity. This might be viewed as analogous to handing a picture of the person on the driver's license to the bank teller when she tries to verify the identity of the check bearer.

In an unsupervised or remote setting, a biometric sample typically comes from a remote sensor. In many instances, the biometric sample may include an image and/or other information that is transferred to the authentication system. Ideally, a remote biometric sensor may be trusted to produce a real biometric sample, such that the biometric sample can be tested and confirmed to, in fact, be from the person requesting access. In a setting such as an ATM, for example, any sensors are typically physically protected and communications with them are cryptographically protected and/or verified. This is not generally the case, however, in a setting such as a web browser running on a remote computer.

Without a trusted, verifiable source, a biometric sample and/or template may have come from anywhere. The simplest attack on some existing systems may be referred to as a "replay attack," which uses evidence or credentials from a prior legitimate transaction to enable a later illegitimate transaction. In the case of biometrics, a common replay attack completely eliminates or bypasses the biometric sensor. When the authentication process requests biometric evidence, the bad actor simply submits a sample that was collected by some other means (e.g., a fingerprint lifted off of a coffee cup or a biometric sample submitted as part of another (legitimate) transaction). Widespread use of biometric verification may portend a world where biometric exemplars are stolen and traded by criminals, just like stolen credit card numbers are marketed today.

Existing systems may be prone to other types off attacks. One such type of attack may be referred to as a "piggyback." In this case, the bad actor copies biometric evidence and simultaneously submits the biometric evidence to enable a second illegitimate transaction. Another type of attack may be referred to as "hijacking," which may be viewed as analogous to what is known as "phishing." In this attack, the user perceives a legitimate transaction and responds by producing a real biometric sample. However the perceived transaction and the actual transaction may be different.

Many of the existing mechanisms meant to protect and enhance users' resources, firewalls, and/or virtual addresses may create problems. For example, a typical means of establishing trust in a biometric sample is to establish control over, and therefore trust in, the biometric sensor. However, this may require establishment of a one-to-one connection between the authentication server and the biometric sensor. This can be both impractical and undesirable because it may require substantial setup, which prevents spontaneous connections, and potentially opens service ports that may be exploited by a bad actor.

SUMMARY

One aspect of the invention relates to a system configured to validate the authenticity and responsiveness of biometric evidence without regard for whether there is direct control over a biometric sensor that acquired the biometric evidence, in accordance with one or more implementations. Although system is described in the context of biometric authentication, this is not intended to be limiting as the principles disclosed herein may be applied to other systems and/or methods that do not involve biometrics or authentication. The system may include one or more of a server, a client computing platform, a sensor, and/or other components. A browser may run on client computing platform. The browser may include software that lets a user view documents, access files, access software, and/or perform other operations associated with browsers. For example, the browser may allow users to view or browse documents on the World Wide Web.

In some implementations, the client computing platform may be communicatively coupled with the sensor such that the sensor is a peripheral device to the client computing platform. According to some implementations, the client computing platform and the sensor may be integrated as a single device.

The server may be configured to control access to one or more protected resources. The protected resources may include one or more of protected information (e.g., classified or personal documents), a protected device (e.g., a nuclear power plant or missile), money (for instance at an ATM), physical access (permission to pass through a doorway), and/or other resources that are protected. According to some implementations, the protected resources may be stored by the server. The protected resources may be stored remotely from the server.

The server may be configured to execute one or more computer program modules. The computer program modules may include one or more of a server communications module, an authentication module, an authorization module, a gatekeeper module, and/or other modules.

The server communications module may be configured to receive information from and transmit information to one or more components of the system. The server communications module may be configured to receive a request to access the protected resources. The server communications module may be configured to transmit a request for biometric evidence. Such a request may include a server challenge configured to identify the server (or components thereof) as the source of the request for biometric evidence. According to some implementations, the server challenge includes a nonce. Generally speaking, a nonce includes a random number generated by a given processor such that the random number is indiscernible prior to its generation except by the given processor. The server communications module is described further herein.

The authentication module may be configured to validate authentication data received via the server communications module. Such authentication data may include information associated with a biometric sample, a biometric template, and/or other information. In accordance with some implementations, the authentication module may be configured to determine whether the authenticity of a biometric sample and/or a biometric template included in authentication data can be verified against an exemplar that is accessible by the one or more processors. The authentication module may be configured to determine whether the responsiveness of a biometric sample and/or biometric template included in authentication data can be verified based on a comparison between sensor response, which may be based on a server challenge and/or may be included in the authentication data, and a server challenge sent with the request for biometric evidence.

The authentication module may be configured to utilize cryptographic technologies to validate authentication data. Such cryptographic technologies may include public-key cryptography and/or other technologies. In some implementations, a private key may be associated with a public certificate stored at the sensor. A public key infrastructure (PKI) (e.g., a certificate signing authority) may maintain a revocation list allowing the trustworthiness of the sensor (e.g., a public key and certificate chain of the sensor) to be revoked. Such revocation may be responsive to an unauthorized transaction being associated with the public certificate of the sensor. A breach of integrity self-reported by the sensor (described further herein) may result in immediate revocation of the public certificate of the sensor. The public certificate of the sensor may be revoked responsive to spoofing attempts. A revocation may be responsive to a certificate being associated with one or more transactions that were later deemed to be illegitimate. A revocation may be dictated by one or more policies associated with a required security level. In some implementations, a PKI with different levels of trustworthiness may be associated with different certificates based on their usage history and other factors.

The authorization module may be configured to verify user information. By way of non-limiting example, user information may include one or more of a user name, a password, a personal identification number (PIN), and/or other user information. In some implementations, authentication data received by the server communications module may include or be received with user information.

The gatekeeper module may be configured to grant access to the protected resource responsive to a positive determination, such as by the authentication module, that the authentication data is valid. The gatekeeper module may be configured to deny access to the protected resource responsive to a determination that the authentication data is not valid.

The sensor may be configured to acquire biometric samples via a sample acquisition apparatus. The sensor may be configured to execute one or more computer program modules. The computer program modules may include one or more of a sensor communications module, an anti-tampering module, a sample acquisition module, an anti-spoofing module, a sample quality determination module, a template extraction module, a data packaging module, a cryptography module, and/or other modules.

The sensor communications module may be configured to receive information from and transmit information to one or more components of the system. The sensor communications module may be configured to transmit a request for identification evidence in response to a request for access to the protected resources. The sensor communications module may be configured to receive a request for biometric evidence. A request for biometric evidence may be received responsive to a request to access a protected resource. The request for biometric evidence may include a server challenge configured to identify a server as the source of the request for biometric evidence. The server challenge may include a nonce. The server challenge may be associated with a particular transaction.

The anti-tampering module may be configured to perform one or more anti-tampering checks to determine whether the biometric sensor has been tampered with. In some implementations, the sensor communications module may be configured to transmit an indication that the sensor has been tampered with responsive to the one or more anti-tampering checks resulting in a positive determination. Such an indication may be received by the server. According to some implementations, the anti-tampering module may be configured to record an indication that the sensor has been tampered with responsive to the one or more anti-tampering checks resulting in a positive determination. The sensor may be further configured to report any prior tampering indications that it has recorded during subsequent communications.

The sample acquisition module may be configured to obtain a biometric sample and/or information associated with the biometric sample from the sample acquisition apparatus.

The anti-spoofing module may be configured to perform one or more anti-spoofing checks to determine whether the biometric sample was obtained from a surrogate feature, prosthetic feature, and/or other illegitimate source. By way of non-limiting example, an anti-spoofing check may be based on multi-spectral illumination used to determine a likelihood that a finger is human flesh. As another example, an anti-spoofing check for iris-based authentication may measure whether a pupil reacts to light to determine whether an eye is alive. In some implementations, the sensor communications module may be configured to transmit an indication that the biometric sample was obtained from a surrogate feature, a prosthetic feature, and/or other non-legitimate source responsive to the one or more anti-spoofing checks resulting in a positive determination. Such an indication may be received by the server.

The sample quality determination module may be configured to determine a quality metric associated with the biometric sample. The quality metric may be descriptive of one or more measurable aspects of the biometric sample. Where the biometric sample includes an image of a body part and/or physical feature of the user, examples of the one or more measurable aspects of the biometric sample may include one or more of image resolution, sharpness, noise, contrast, distortion, vignetting, a presence of one or more artifacts, and/or other quality metrics. According to some implementations, the sample quality determination module may be configured to determine whether a biometric template of sufficient quality can be extracted from the sample. By way of non-limiting illustration, the image quality might be good, but the person blinked, resulting in complete or partial occlusion of the iris features. The sample quality determination module may be configured to reject the biometric sample responsive to the quality metric associated with the biometric sample breaching a quality threshold.

The template extraction module may be configured to extract a biometric template associated with the biometric sample. The biometric template may include measurement data from the biometric sample. For example, where the biometric sample includes an image of a fingerprint, the measurement data of the biometric template may include minutia data. Generally speaking, minutia data may be descriptive of one or more of a type, location, or orientation of individual fingerprint features within a pattern of the fingerprint.

The data packaging module may be configured to provide authentication data based on the biometric sample. In some implementations, the data packaging module is configured to combine the biometric template and the server challenge into a unit of data serving as the authentication evidence. Combining the biometric template and the server challenge into a unit of data may include packing the biometric template and the server challenge into a single data block. In accordance with some implementations, combining the biometric template and the server challenge into a unit of data may include (1) packing the biometric template and the server challenge into two or more data blocks, (2) obtaining hashes of the two or more data blocks, and (3) obtaining a cross-coupled data block that includes the hashes of the two or more data blocks. In accordance with some implementations, the data block may include data derived from the challenge, in lieu of or in addition to the original challenge. For example, the data block may include a response to the challenge.

The cryptography module may be configured to apply one or more cryptographic techniques to the evidence and/or a unit of data conveying the evidence. By way of non-limiting example, cryptographic techniques may include signing the evidence and/or unit of data, encrypting the evidence and/or unit of data, and/or other cryptographic techniques. Cryptographic techniques may allow a recipient of the evidence and/or unit of data to verify that the evidence and/or unit of data has not been modified since it was created. Cryptographic techniques may allow the recipient to verify the source of evidence and/or unit of data. In some implementations, the evidence and/or unit of data may be signed with a digital signature. In some implementations, the evidence and/or unit of data may be encrypted. Encrypting the evidence and/or unit of data may have the additional benefit of hiding the evidence and/or unit of data, which may further protect the evidence and/or unit of data from being misused. The cryptography module may be configured to sign or encrypt using a private key stored at the sensor. Such a private key may be associated with a PKI certificate stored at the sensor. As such, the biometric evidence may be validated by the server using the public certificate of the sensor. The public certificate of the sensor may be validated using a known public key of the manufacturer of the sensor. In some implementations, a certificate chain may include information that the sensor can use to determine a security level afforded by the sensor. By way of non-limiting example, a manufacturer, model number, serial number, and/or other identifying information may be encoded in the certificate chain to indicate a security level afforded by the sensor. Additionally, in some implementations, the cryptography module may be configured to sign or encrypt an indication that the sensor has been tampered with, an indication that the biometric sample was obtained from a surrogate feature, a prosthetic feature, and/or other non-legitimate source, and/or other information transmitted by the sensor communications module.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

A trust relationship may be established between a biometric sample and a server configured for biometric authentication, in accordance with one or more implementations. This may overcome one or more disadvantages of existing approaches to biometric authentication in that the server trusts a biometric sample without being able to directly connect to and/or interrogate a biometric sensor that acquired the biometric sample. This is commonly the case when a service relying on biometric verification is web-based and the biometric evidence (e.g., biometric sample and/or biometric template) is being submitted via a web browser. According to exemplary implementations, the trust may be established by ensuring that any biometric evidence submitted for verification is submitted in response to an intended transaction. For example, in some implementations, only a data block containing a biometric sample and/or template that is (1) appended with a server-generated challenge (e.g., a nonce) and (2) signed or encrypted by the biometric sensor may validate that the biometric evidence is responsive to a current request and belongs to a current authentication session. In some implementations, trust may be established and/or enhanced due to one or more security features (e.g., anti-spoofing, anti-tampering, and/or other security features) being collocated with the biometric sensor at the actual biometric sampling site.

Figure 1:
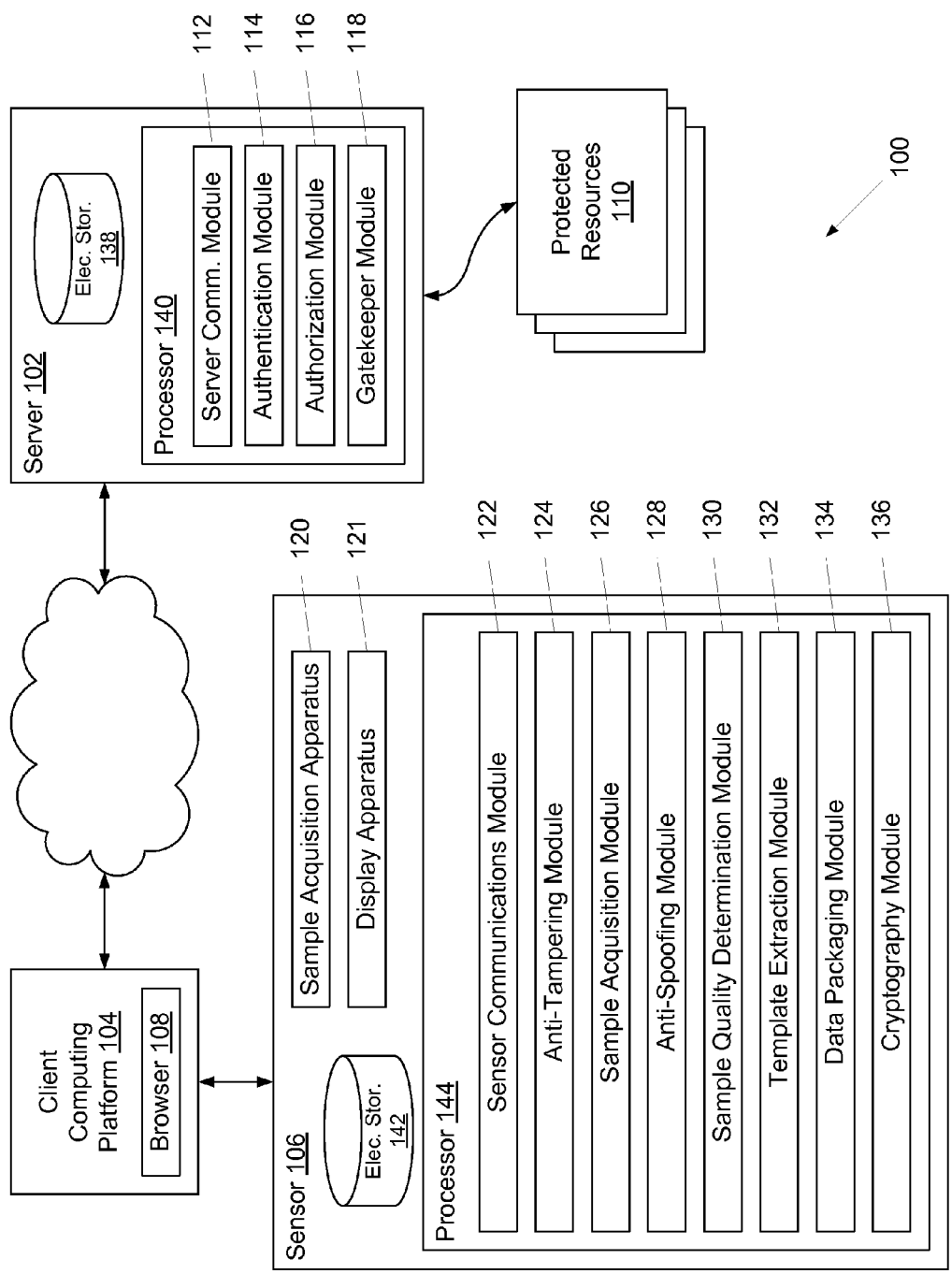
FIG. 1 illustrates a system configured to validate the authenticity and responsiveness of biometric evidence without regard for whether there is direct control over a biometric sensor that acquired the biometric evidence, in accordance with one or more implementations.

FIG. 1 illustrates a system 100 configured to validate the authenticity and responsiveness of biometric evidence without regard for whether there is direct control over a biometric sensor that acquired the biometric evidence, in accordance with one or more implementations. Although system 100 is described in the context of biometric authentication, this is not intended to be limiting as the principles disclosed herein may be applied to other systems and/or methods that do not involve biometrics or authentication. As depicted in FIG. 1, system 100 may include one or more of a server 102, a client computing platform 104, a sensor 106, and/or other components. A browser 108 may run on client computing platform 104. The browser 108 may include software that lets a user view documents, access files, access software, and/or perform other operations associated with browsers. For example, browser 108 may allow users to view or browse documents on the World Wide Web.

In some implementations, client computing platform 104 may be communicatively coupled with sensor 106 such that sensor 106 is a peripheral device to client computing platform 104. According to some implementations, client computing platform 104 and sensor 106 may be integrated as a single device.

The server 102 may be configured to control access to one or more protected resources 110. The protected resources 110 may include one or more of protected information (e.g., classified or personal documents), a protected device (e.g., a nuclear power plant or missile), money (for instance at an ATM), physical access (permission to pass through a doorway), and/or other resources that are protected. According to some implementations, protected resources 110 may be stored by server 102. The protected resources 110 may be stored remotely from server 102.

The server 102 may be configured to communicate with client computing platforms 104, the sensor 106, and/or other components of system 100 according to a client/server architecture. The server 102 may be configured to execute one or more computer program modules. The computer program modules may include one or more of a server communications module 112, an authentication module 114, an authorization module 116, a gatekeeper module 118, and/or other modules.

The server communications module 112 may be configured to receive information from and transmit information to one or more components of system 100. The server communications module 112 may be configured to receive a request to access protected resources 110. The server communications module 112 may be configured to transmit a request for biometric evidence. Such a request may include a server challenge configured to identify server 102 (or components thereof) as the source of the request for biometric evidence. According to some implementations, the server challenge includes a nonce. Generally speaking, a nonce includes a random number generated by a given processor such that the random number is indiscernible prior to its generation except by the given processor. The server communications module 112 is described further herein.

The authentication module 114 may be configured to validate authentication data received via server communications module 112. Such authentication data may include information associated with a biometric sample, a biometric template, and/or other information. In accordance with some implementations, authentication module 114 may be configured to determine whether the authenticity of a biometric sample and/or a biometric template included in authentication data can be verified against an exemplar that is accessible by the one or more processors. The authentication module 114 may be configured to determine whether the responsiveness of a biometric sample and/or biometric template included in authentication data can be verified based on a comparison between sensor response, which may be based on a server challenge and/or may be included in the authentication data, and a server challenge sent with the request for biometric evidence.

The authentication module 114 may be configured to utilize cryptographic technologies to validate authentication data. Such cryptographic technologies may include public-key cryptography and/or other technologies. In some implementations, a private key may be associated with a public key infrastructure (PKI) certificate stored at sensor 106. Generally speaking, a public key infrastructure certificate may identify one or more of a manufacturer of a sensor, a vendor of a sensor, a sensor type, a sensor model, a serial number, a security feature, a security level, and/or other information associated with a sensor that is the same or similar to sensor 106. A public key infrastructure (e.g., a certificate signing authority) may maintain a revocation list allowing the trustworthiness of sensor 106 (e.g., a public key and certificate chain of sensor 106) to be revoked. Such revocation may be responsive to an unauthorized transaction being associated with the public certificate of sensor 106. A breach of integrity self-reported by sensor 106 (described further herein) may result in immediate revocation of the public certificate of sensor 106. The public certificate of sensor 106 may be revoked responsive to spoofing attempts. A revocation may be responsive to a certificate being associated with one or more transactions that were later deemed to be illegitimate. A revocation may be dictated by one or more policies associated with a required security level. In some implementations, a PKI with different levels of trustworthiness may be associated with different certificates based on their usage history and other factors.

The authorization module 116 may be configured to verify user information. By way of non-limiting example, user information may include one or more of a user name, a password, a personal identification number (PIN), and/or other user information. In some implementations, authentication data received by server communications module 112 may include or be received with user information.

The gatekeeper module 118 may be configured to grant access to protected resource 110 responsive to a positive determination, such as by the authentication module 114, that the authentication data is valid. The gatekeeper module 118 may be configured to deny access to protected resource 110 responsive to a determination that the authentication data is not valid.

The sensor 106 may be configured to acquire biometric samples via a sample acquisition apparatus 120. According to various implementations, sample acquisition apparatus 120 may include one or more of a camera, an imaging device, an illuminator, a lens, a cradle, a capacitive measurement device, a transducer, and/or other apparatuses configured to acquire biometric samples. In some implementations, obtaining a biometric sample may include capturing an image of a body part and/or physical feature of the user. This may include an image of a fingerprint, a face, an iris pattern, a voice print, a vein pattern, and/or other body parts or physical features of the user.

The display apparatus 121 may be configured to display information from sensor 106 and/or other components of system 100 to a user. In some implementations, display apparatus 121 may be configured to present a transaction identifier to a user. The transaction identifier may convey information identifying a specific transaction. This may allow a user to verify that a biometric sample is being gathered in response to the perceived transaction. The transaction identifier may be presented as one or more of an image, an icon, text, or other visual identifier. In some implementations, display apparatus 121 may display a URL of a service that has requested biometric evidence.

The sensor 106 may be configured to execute one or more computer program modules. The computer program modules may include one or more of a sensor communications module 122, an anti-tampering module 124, a sample acquisition module 126, an anti-spoofing module 128, a sample quality determination module 130, a template extraction module 132, a data packaging module 134, a cryptography module 136, and/or other modules.

The sensor communications module 122 may be configured to receive information from and transmit information to one or more components of system 100. The sensor communications module 122 may be configured to transmit a request for identification evidence in response to a request for access to protected resources 110. The sensor communications module 122 may be configured to receive a request for biometric evidence. A request for biometric evidence may be received responsive to a request to access a protected resource. The request for biometric evidence may include a server challenge configured to identify a server (e.g., server 102) as the source of the request for biometric evidence. The server challenge may include a nonce. The server challenge may be associated with a particular transaction.

The anti-tampering module 124 may be configured to perform one or more anti-tampering checks to determine whether the biometric sensor has been tampered with. By way of non-limiting example, sensor 106 may include an electrically conductive foil strip positioned so that it will be glued to screws that hold a housing case of sensor 106 together. Once the glue hardens, removing the screws will break the foil, resulting in a discernable change in the resistance of the foil. As part of the manufacturing process, the foil's resistance may be measured and stored in write-once memory with sensor 106. As part of its anti-tampering check, sensor 106 may measure the resistance of the foil and compare it to the stored value. In some implementations, sensor communications module 122 may be configured to transmit an indication that sensor 106 has been tampered with responsive to the one or more anti-tampering checks resulting in a positive determination. Such an indication may be received by server 102. According to some implementations, anti-tampering module 124 may be configured to record an indication that sensor 106 has been tampered with responsive to the one or more anti-tampering checks resulting in a positive determination. The sensor 106 may be further configured to report any prior tampering indications that it has recorded during subsequent communications.

The sample acquisition module 126 may be configured to obtain a biometric sample and/or information associated with the biometric sample from sample acquisition apparatus 120.

The anti-spoofing module 128 may be configured to perform one or more anti-spoofing checks to determine whether the biometric sample was obtained from a surrogate feature, prosthetic feature, and/or other illegitimate source. By way of non-limiting example, an anti-spoofing check may be based on multi-spectral illumination used to determine a likelihood that a finger is human flesh. As another example, an anti-spoofing check for iris-based authentication may measure whether a pupil reacts to light to determine whether an eye is alive. In some implementations, sensor communications module 122 may be configured to transmit an indication that the biometric sample was obtained from a surrogate feature, a prosthetic feature, and/or other non-legitimate source responsive to the one or more anti-spoofing checks resulting in a positive determination. Such an indication may be received by server 102.

The sample quality determination module 130 may be configured to determine a quality metric associated with the biometric sample. The quality metric may be descriptive of one or more measurable aspects of the biometric sample. Where the biometric sample includes an image of a body part and/or physical feature of the user, examples of the one or more measurable aspects of the biometric sample may include one or more of image resolution, sharpness, noise, contrast, distortion, vignetting, a presence of one or more artifacts, and/or other quality metrics. According to some implementations, sample quality determination module 130 may be configured to determine whether a biometric template of sufficient quality can be extracted from the sample. By way of non-limiting illustration, the image quality might be good, but the person blinked, resulting in complete or partial occlusion of the iris features. The sample quality determination module 130 may be configured to reject the biometric sample responsive to the quality metric associated with the biometric sample breaching a quality threshold.

The template extraction module 132 may be configured to extract a biometric template associated with the biometric sample. The biometric template may include measurement data from the biometric sample. For example, where the biometric sample includes an image of a fingerprint, the measurement data of the biometric template may include minutia data. Generally speaking, minutia data may be descriptive of one or more of a type, location, or orientation of individual fingerprint features within a pattern of the fingerprint.

The data packaging module 134 may be configured to provide authentication data based on the biometric sample. In some implementations, data packaging module 134 is configured to combine the biometric template and the server challenge into a unit of data serving as the authentication evidence. Combining the biometric template and the server challenge into a unit of data may include packing the biometric template and the server challenge into a single data block. An exemplary data collection block is described in connection with FIG. 2. In accordance with some implementations, combining the biometric template and the server challenge into a unit of data may include (1) packing the biometric template and the server challenge into two or more data blocks, (2) obtaining hashes of the two or more data blocks, and (3) obtaining a cross-coupled data block that includes the hashes of the two or more data blocks. In accordance with some implementations, the data block may include data derived from the challenge, in lieu of or in addition to the original challenge. For example, the data block may include a response to the challenge.

The cryptography module 136 may be configured to apply one or more cryptographic techniques to the evidence and/or a unit of data conveying the evidence. By way of non-limiting example, cryptographic techniques may include signing the evidence and/or unit of data, encrypting the evidence and/or unit of data, and/or other cryptographic techniques. Cryptographic techniques may allow a recipient of the evidence and/or unit of data to verify that the evidence and/or unit of data has not been modified since it was created. Cryptographic techniques may allow the recipient to verify the source of evidence and/or unit of data. In some implementations, the evidence and/or unit of data may be signed with a digital signature. In some implementations, the evidence and/or unit of data may be encrypted. Encrypting the evidence and/or unit of data may have the additional benefit of hiding the evidence and/or unit of data, which may further protect the evidence and/or unit of data from being misused. The cryptography module may be configured to sign or encrypt using a private key stored at sensor 106. Such a private key may be associated with a PKI certificate stored at sensor 106. As such, the biometric evidence may be validated by server 102 using the public certificate of sensor 106. The public certificate of sensor 106 may be validated using a known public key of the manufacturer of sensor 106. In some implementations, a certificate chain may include information that sensor 106 can use to determine a security level afforded by sensor 106. By way of non-limiting example, a manufacturer, model number, serial number, and/or other identifying information may be encoded in the certificate chain to indicate a security level afforded by sensor 106. Additionally, in some implementations, cryptography module 136 may be configured to sign or encrypt an indication that sensor 106 has been tampered with, an indication that the biometric sample was obtained from a surrogate feature, a prosthetic feature, and/or other non-legitimate source, and/or other information transmitted by sensor communications module 122.

Figure 2:
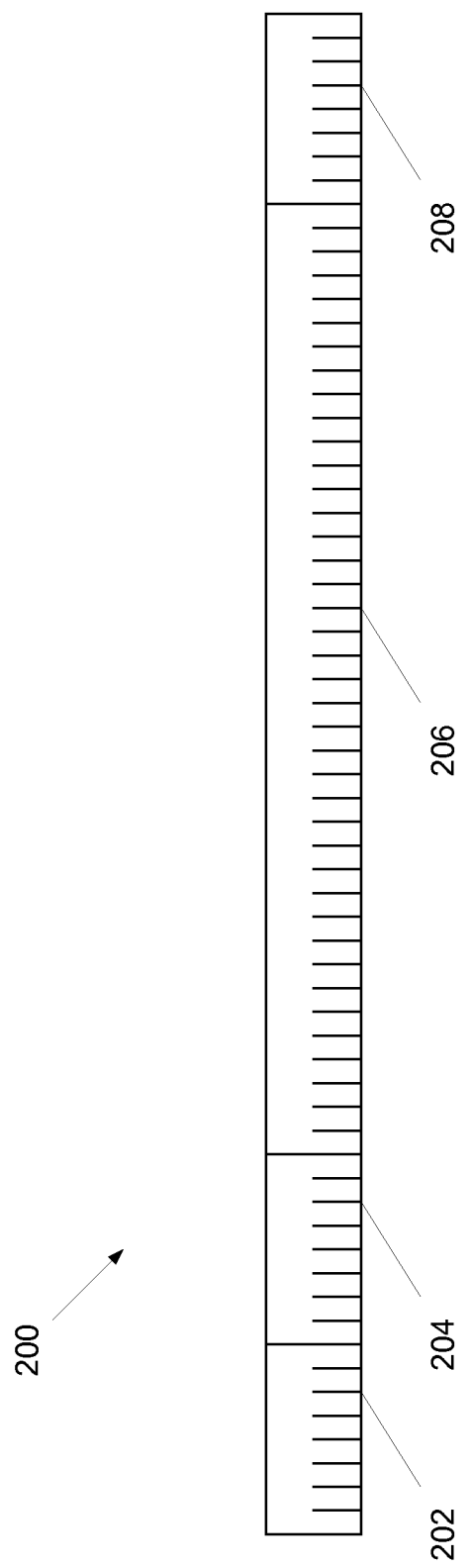
FIG. 2 illustrates a data collection block, in accordance with one or more implementations.

FIG. 2 illustrates a data collection block 200, in accordance with one or more implementations. The data collection block 200 may include a sequence of bytes, a data stream, and/or another unit of data. In some implementations, data collection block 200 may include two or more separate units of data, individual ones of which including more, less, or similar information as shown in FIG. 2. As depicted in FIG. 2, data collection block 200 includes nonce byte(s) 202, status byte(s) 204, biometric template byte(s) 206, digital signature byte(s) 208, and/or byte(s) conveying other information. The depiction of data collection block 200 is not intended to be limiting. For example, the arrangement of bytes in data collection block 200 may be different than depicted, in accordance with some implementations. As another example, data collection block 200 may include one or more padding bytes configured to protect the integrity of a cryptographic scheme applied to data collection block 200. In some implementations, data collection block 200 is provided by a data packaging module that is the same or similar to data packaging module 134.

The nonce byte(s) 202 may convey information associated with a nonce and/or other server challenge sent by server 102, in some implementations. The nonce byte(s) 202 may be provided in conjunction with a server communications module that is the same or similar to server communications module 112, in some implementations.

The status byte(s) 204 may convey information associated with an indication that a tampering attempt has been made, an indication that a spoofing attempt has been made, a status indication of sensor 106, a status indication of client computing platform 104, and/or other information associated with client computing platform 104 and/or sensor 106. According to some implementations, status byte(s) 204 may be provided in conjunction with one or more modules that are the same or similar to one or more modules of sensor 106. In one implementation, for example, status byte(s) 204 may be provided in conjunction with anti-tampering module 124, anti-spoofing module 128, template extraction module 132, cryptography module 136, and/or other modules of sensor 106.

The biometric template byte(s) 206 may convey information associated with a biometric template, a biometric sample, and/or other biometric evidence. In accordance with some implementations, biometric template byte(s) 206 may be provided in conjunction with a sample acquisition module that is the same or similar to anti-tampering module 124, and/or a template extraction module that is the same or similar to template extraction module 132.

The digital signature byte(s) 208 may convey information associated with a signature provided at sensor 106. The digital signature byte(s) 208 may serve to validate nonce byte(s) 202, status byte(s) 204, biometric template byte(s) 206, and/or other bytes included in data collection block 200. The digital signature byte(s) 208 may be provided in conjunction with a cryptography module that is the same or similar to cryptography module 136.

Figure 3A:
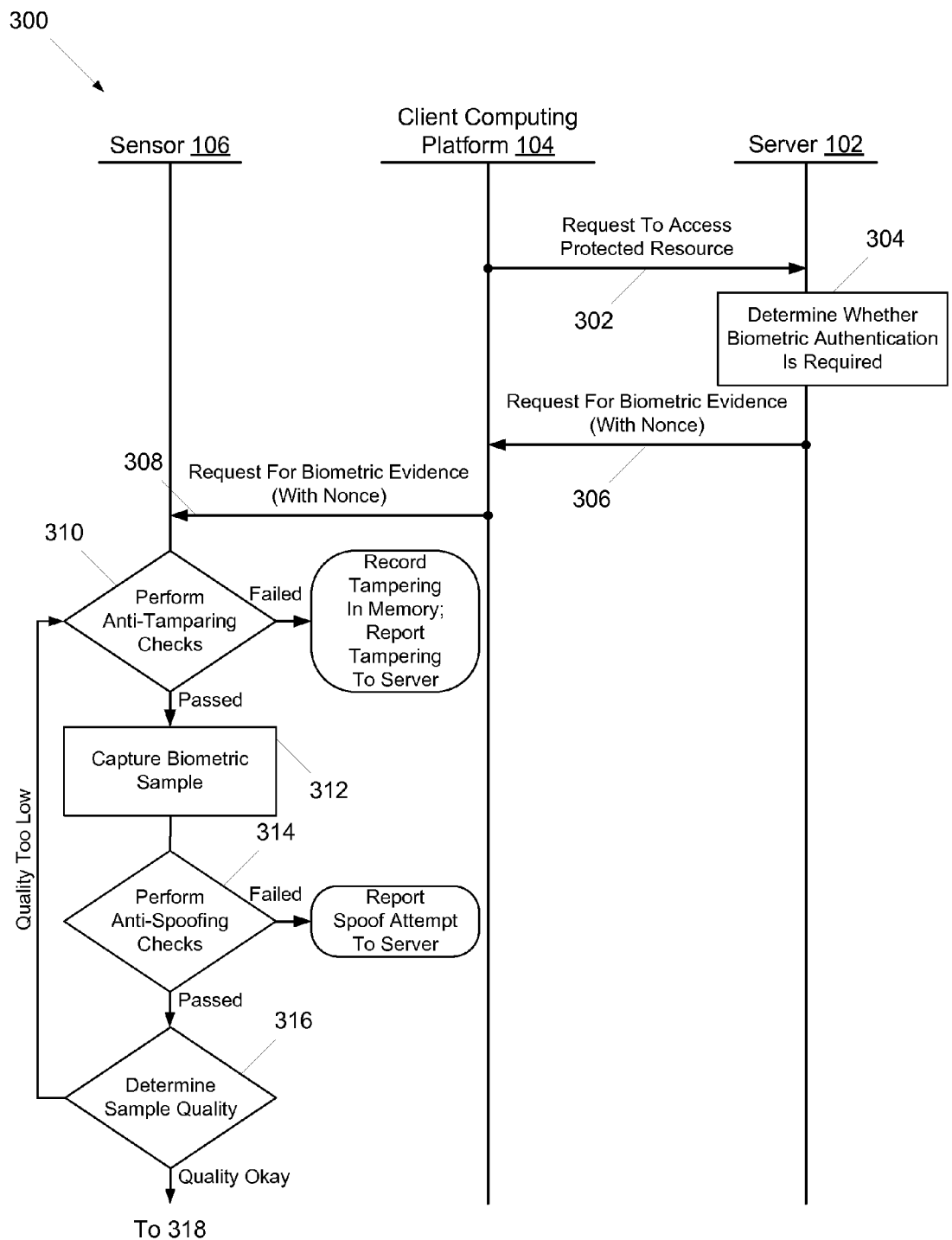
FIGS. 3A and 3B illustrate a method for validating the authenticity and responsiveness of biometric evidence without regard for whether there is direct control over a biometric sensor that acquired the biometric evidence, in accordance with one or more implementations.
Figure 3B:
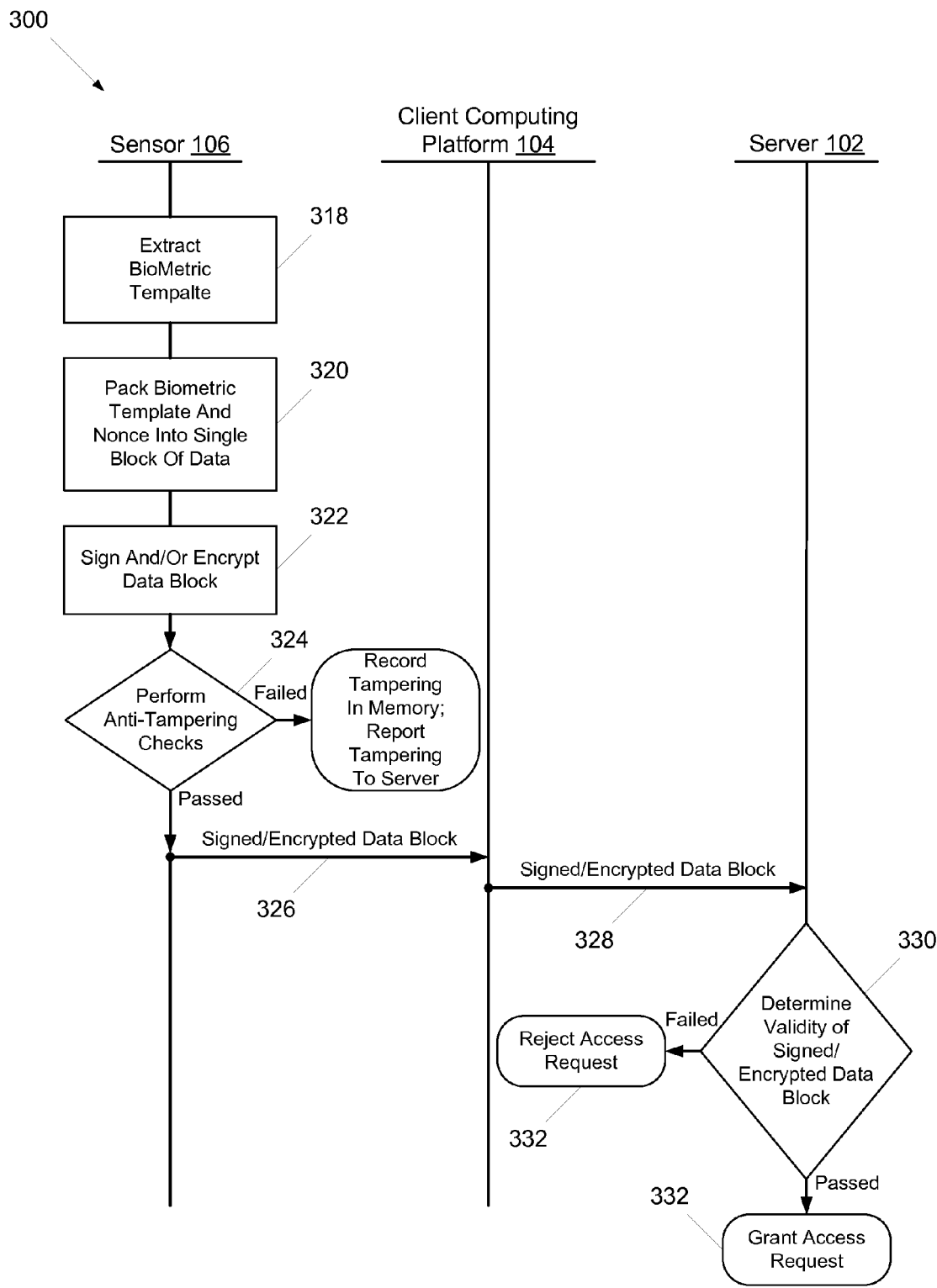

FIGS. 3A and 3B illustrate a method 300 for establishing trust in biometric evidence without regard for whether there is direct control over a biometric sensor that acquired the biometric evidence, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a request to access a protected resource (e.g., protected resources 110) is transmitted from client computing platform 104 to server 102. In some implementations, the request may be passed from browser 108 running on client computing platform 104 to server 102. The operation 302 may be performed in conjunction with a server communications module that is the same or similar to server communications module 112, in accordance with some implementations.

At an operation 304, server 102 may determine whether a biometric authentication is required to grant access to the protected resource. The biometric authentication may include confirmation that a user claiming a given identity and seeking access to the protected resource actually has an identity matching the claimed identity. In some implementations, operation 304 may be performed by an authentication module that is the same or similar to authentication module 114.

At an operation 306, a request for biometric evidence may be transmitted from server 102 to client computing platform 104. In some implementations, the request for biometric evidence may be transmitted from server 102 to browser 108 running on client computing platform 104. The biometric evidence may include a biometric sample, a biometric template, and/or other biometric evidence configured to facilitate biometric authentication. The request for biometric evidence may include a nonce and/or other server challenge configured to identify server 102 as the source of the request for biometric evidence. The operation 306 may be performed in conjunction with a server communications module that is the same or similar to server communications module 112, according to some implementations.

At an operation 308, the request for the biometric evidence may be transmitted from client computing platform 104 to sensor 106. In some implementations, the request for biometric evidence may be transmitted from browser 108 running on client computing platform 104 to sensor 106. The operation 308 may be performed in conjunction with a sensor communications module that is the same or similar to sensor communications module 122, in accordance with some implementations.

At an operation 310, one or more anti-tampering checks may be performed to determine whether sensor 106 has been tampered with. In some implementations, responsive to the one or more anti-tampering checks resulting in a positive determination (i.e., that an anti-tampering check failed), an indication that sensor 106 has been tampered with may be transmitted to server 102 and/or may be recorded in memory at sensor 106. In some implementations, sensor 106 may transmit records of tampering. In accordance with some implementations, operation 310 may be performed by an anti-tampering module that is the same or similar to anti-tampering module 124.

At an operation 312, a biometric sample may be obtained at sensor 106. The biometric sample may include data associated with a physical feature associated with the user seeking access to the protected resource. In some implementations, obtaining the biometric sample may include capturing an image of a body part of the user (e.g., a finger print, a face, an iris pattern, and/or other body part). The operation 312 may be performed by sample acquisition apparatus 120 of sensor 106 in conjunction with a sample acquisition module that is the same or similar to sample acquisition module 126, in accordance with some implementations.

At an operation 314, one or more anti-spoofing checks may be performed to determine whether the biometric sample was obtained from a surrogate feature, prosthetic feature, and/or other illegitimate source. In some implementations, responsive to the one or more anti-spoofing checks resulting in a positive determination (i.e., that an anti-spoofing check failed), an indication that the biometric sample was obtained from a surrogate feature, a prosthetic feature, and/or other non-legitimate source may be transmitted to server 102. According to some implementations, operation 314 may be performed by an anti-spoofing module that is the same or similar to anti-spoofing module 128.

At an operation 316, a quality metric associated with the biometric sample may be determined. The quality metric may be descriptive of one or more measurable aspects of the biometric sample. By way of non-limiting example, where the biometric sample includes an image of a body part of the user, the one or more measurable aspects of the biometric sample may include one or more of image resolution, sharpness, noise, contrast, distortion, vignetting, a presence of one or more artifacts, and/or other metrics. The biometric sample may be rejected responsive to the quality metric associated with the biometric sample breaching a quality threshold. The biometric sample may be rejected because it did not produce an acceptable biometric template. For example, in some implementations, when the quality of the biometric sample is too low, method 300 may proceed to operation 310, operation 312, or another operation of method 300. The operation 316 may be performed by a sample quality determination module that is the same or similar to sample quality determination module 130, in some implementations.

At an operation 318, a biometric template associated with the biometric sample may be extracted. The biometric template may include measurement data from the biometric sample. By way of non-limiting example, where the biometric sample includes an image of a fingerprint, the measurement data of the biometric template may include minutia data. Generally speaking, minutia data may be descriptive of one or more of a type, location, or orientation of individual fingerprint features within a pattern of the fingerprint. In some implementations, operation 318 may be performed by a template extraction module that is the same or similar to template extraction module 132.

At an operation 320, the biometric template and the challenge (nonce) issued by server 102 may be combined into a single data block (e.g., data collection block 200). The operation 320 may be performed by a data packaging module that is the same or similar to data packaging module 134, in accordance with some implementations.

At an operation 322, the data block may be signed and/or encrypted. In some implementations, the evidence and/or unit of data may be signed with a digital signature. In some implementations, the evidence and/or unit of data may be encrypted. Signing and/or encrypting the evidence and/or unit of data may be performed with a private key stored at sensor 106. In some implementations, operation 322 may be performed by a cryptography module that is the same or similar to cryptography module 136.

At an operation 324, one or more anti-tampering checks may be performed to determine whether sensor 106 has been tampered with. In some implementations, responsive to the one or more anti-tampering checks resulting in a positive determination (i.e., that an anti-tampering check failed), an indication that sensor 106 has been tampered with may be transmitted to server 102 and/or may be recorded in memory at sensor 106. Sensor 106 may transmit recorded indications of tampering. In accordance with some implementations, operation 324 may be performed by an anti-tampering module that is the same or similar to anti-tampering module 124.

At an operation 326, the signed and/or encrypted data block may be transmitted from sensor 106 to client computing platform 104. In some implementations, the signed and/or encrypted data block may be transmitted from sensor 106 to browser 108 running on client computing platform 104. The operation 326 may be performed in conjunction with a sensor communications module that is the same or similar to sensor communications module 122, according to some implementations.

At an operation 328, the signed and/or encrypted data block may be transmitted from client computing platform 104 to server 102. In some implementations, the signed and/or encrypted data block may be passed from browser 108 running on client computing platform 104 to server 102. During operation 328, additional user information may be transmitted to server 102. Such additional user information may include one or more of a user name, a password, a personal identification number (PIN), and/or other user information. According to some implementations, operation 328 may be performed in conjunction with a server communications module that is the same or similar to server communications module 112.

At an operation 330, a determination may be made as to whether the signed and/or encrypted unit of data is valid, which may be performed by an authentication module that is the same or similar to authentication module 114. Determining whether the signed and/or encrypted data block is valid may include comparing the biometric template and nonce sent from sensor 106 (via the signed and/or encrypted data block) to an exemplar and a challenge (nonce) stored by server 102. The operation 330 may include determining whether any additional user information transmitted with the signed and/or encrypted unit of data is valid, which may be performed by an authorization module that is the same or similar to authorization module 116.

At an operation 332, access to the protected resource may be granted responsive to a determination that the signed and/or encrypted data block is valid, or access to the protected resource may be denied responsive to a determination that the signed and/or encrypted data block is not valid. In accordance with some implementations, operation 332 may be performed by a gatekeeper module that is the same or similar to gatekeeper module 118.

Referring again to FIG. 1, server 102, client computing platform 104, protected resources 110, and/or other components of system 100 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 102, client computing platform 104, protected resources 110, and/or other components of system 100 may be operatively linked via some other communication media or may be directly connected.

The client computing platform 104 may include one or more processors configured to execute computer program modules. The computer program modules may be configured to enable an expert or user associated with the client computing platform 104 to interface with sensor 106, protected resources 110, and/or other components of system 100, and/or provide other functionality attributed herein to client computing platform 104. By way of non-limiting example, client computing platform 104 may include one or more of a desktop computer, a laptop computer, a handheld computer, a NetBook, a Smartphone, a gaming console, and/or other computing platforms.

The server 102 may include electronic storage 138, one or more processors 140, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

The electronic storage 138 may comprise electronic storage media that electronically stores information. The electronic storage media of electronic storage 138 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). The electronic storage 138 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 138 may include one or more virtual storage resources (e.g., cloud storage, a virtual private network, and/or other virtual storage resources). The electronic storage 138 may store software algorithms, information determined by processor(s) 140, information received from server 102, information received from client computing platform 104, information received from sensor 106, and/or other information that enables server 102 to function as described herein.

Processor(s) 140 is configured to provide information processing capabilities in server 102. As such, processor(s) 140 may include one or more of a digital processor, an analog processor, a digital circuit designed to process information, an analog circuit designed to process information, a state machine, and/or other mechanisms for electronically processing information. Although processor(s) 140 is shown in FIG. 1 as a single entity, this is for illustrative purposes only. In some implementations, processor(s) 140 may include a plurality of processing units. These processing units may be physically located within the same device, or processor(s) 140 may represent processing functionality of a plurality of devices operating in coordination. The processor(s) 140 may be configured to execute modules 112, 114, 116, 118, and/or other modules. The processor(s) 140 may be configured to execute modules 112, 114, 116, 118, and/or other modules by software; hardware; firmware; some combination of software, hardware, and/or firmware; and/or other mechanisms for configuring processing capabilities on processor(s) 140.

It should be appreciated that although modules 112, 114, 116, and 118 are illustrated in FIG. 1 as being co-located within a single processing unit, in implementations in which processor(s) 140 includes multiple processing units, one or more of modules 112, 114, 116, and/or 118 may be located remotely from the other modules. The description of the functionality provided by the different modules 112, 114, 116, and/or 118 described below is for illustrative purposes, and is not intended to be limiting, as any of modules 112, 114, 116, and/or 118 may provide more or less functionality than is described. For example, one or more of modules 112, 114, 116, and/or 118 may be eliminated, and some or all of its functionality may be provided by other ones of modules 112, 114, 116, and/or 118. As another example, processor(s) 140 may be configured to execute one or more additional modules that may perform some or all of the functionality attributed below to one of modules 112, 114, 116, and/or 118.

The sensor 106 may include electronic storage 142, one or more processors 144, and/or other components. The sensor 106 may include communication lines, or ports to enable the exchange of information with a network and/or other computing platforms. Illustration of sensor 106 in FIG. 1 is not intended to be limiting. The sensor 106 may include a plurality of hardware, software, and/or firmware components operating together to provide the functionality attributed herein to sensor 106.

The electronic storage 142 may comprise electronic storage media that electronically stores information. The electronic storage media of electronic storage 142 may include one or both of system storage that is provided integrally (i.e., substantially non-removable) with sensor 106 and/or removable storage that is removably connectable to sensor 106 via, for example, a port (e.g., a USB port, a firewire port, etc.) or a drive (e.g., a disk drive, etc.). The electronic storage 142 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 142 may include one or more virtual storage resources (e.g., cloud storage, a virtual private network, and/or other virtual storage resources). The electronic storage 142 may store software algorithms, information determined by processor(s) 144, information received from server 102, information received from client computing platform 104, and/or other information that enables sensor 106 to function as described herein.

The processor(s) 144 is configured to provide information processing capabilities in sensor 106. As such, processor(s) 144 may include one or more of a digital processor, an analog processor, a digital circuit designed to process information, an analog circuit designed to process information, a state machine, and/or other mechanisms for electronically processing information. Although processor(s) 144 is shown in FIG. 1 as a single entity, this is for illustrative purposes only. In some implementations, processor(s) 144 may include a plurality of processing units. These processing units may be physically located within the same device, or processor(s) 144 may represent processing functionality of a plurality of devices operating in coordination. The processor(s) 144 may be configured to execute modules 122, 124, 126, 128, 130, 132, 134, 136, and/or other modules. The processor(s) 144 may be configured to execute modules 122, 124, 126, 128, 130, 132, 134, 136, and/or other modules by software; hardware; firmware; some combination of software, hardware, and/or firmware; and/or other mechanisms for configuring processing capabilities on processor(s) 144.

It should be appreciated that although modules 122, 124, 126, 128, 130, 132, 134, and 136 are illustrated in FIG. 1 as being co-located within a single processing unit, in implementations in which processor(s) 144 includes multiple processing units, one or more of modules 122, 124, 126, 128, 130, 132, 134, and/or 136 may be located remotely from the other modules. The description of the functionality provided by the different modules 122, 124, 126, 128, 130, 132, 134, and/or 136 described below is for illustrative purposes, and is not intended to be limiting, as any of modules 122, 124, 126, 128, 130, 132, 134, and/or 136 may provide more or less functionality than is described. For example, one or more of modules 122, 124, 126, 128, 130, 132, 134, and/or 136 may be eliminated, and some or all of its functionality may be provided by other ones of modules 122, 124, 126, 128, 130, 132, 134, and/or 136. As another example, processor(s) 144 may be configured to execute one or more additional modules that may perform some or all of the functionality attributed below to one of modules 122, 124, 126, 128, 130, 132, 134, and/or 136.

Although implementations of the present invention are described in the context of biometrics, this is not intended to be limiting. For example, some implementations may be applicable to any field that requires a sensor to verify that data it transmits is contemporaneous and valid. Examples of such fields may include security cameras, alarm systems, house arrest bracelets, smart card readers, credit card readers, magnetic stripe readers, and/or other fields. By way of non-limiting example, a security camera may include an implementation of the present invention to prevent someone from replacing a live video feed with a replay, or other false video, which might be used to present a false situation (e.g., no one's in the corridor) to a monitor. As another non-limiting example, a cryptographically verifiable, consumer owned, credit card swipe sensor may provide a level of security to online credit card transactions by invoking an implementation of the present invention. As yet another non-limiting example, a smart card reader may utilize an implementation of the present invention such that a server challenge (e.g., a nonce) may be signed and/or encrypted by a sensor of the smart card reader and by the smart card itself (e.g., by a processor included in the smart card so as not to reveal cryptographic secrets of the smart card), thus inexorably tying the transaction to the particular sensor and smart card.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system configured to acquire evidence that is to be provided for validation of the authenticity and responsiveness of the evidence, the system comprising:
   a sensor configured to acquire one or more samples;
   one or more hardware processors communicatively coupled with the sensor and configured by machine-readable instructions to:
      receive a request for evidence from an external client computing platform, the evidence to include one or more samples or a representation of one or more samples, the request for evidence including a challenge;
      obtain individual ones of the one or more samples acquired by the sensor;
      combine the evidence and a response to the challenge into a signed or encrypted unit of data; wherein combining the evidence and the response to the challenge into the signed or encrypted unit of data includes:
         packing the evidence and the response to the challenge into two or more data blocks;
         obtaining hashes of the two or more data blocks; and
         obtaining another data block that includes the hashes of the two or more data blocks;
      effectuate transmission of the signed or encrypted unit of data to a server by way of a client computing platform communicatively coupled with the sensor.

2. The system of claim 1, wherein the challenge includes a nonce, the nonce including a random number generated by a given hardware processor, the random number being indiscernible prior to its generation except by the given hardware processor.

3. The system of claim 1, wherein the one or more hardware processors are further configured by machine-readable instructions to perform one or more anti-tampering checks to determine whether the sensor has been tampered with.

4. The system of claim 3, wherein the one or more hardware processors are further configured by machine-readable instructions to effectuate transmission of an indication that the sensor has been tampered with responsive to the one or more anti-tampering checks resulting in a positive determination.

5. The system of claim 3, wherein the one or more hardware processors are further configured by machine-readable instructions to record an indication that the sensor has been tampered with.

6. The system of claim 1, wherein individual ones or the one or more samples acquired by the sensor include a biometric sample obtained for one or more of biometric authentication, identification, verification, and/or enrollment.

7. The system of claim 1, wherein the one or more hardware processors are further configured by machine-readable instructions to extract a template associated with a given sample acquired by the sensor, the template including measurement data from the given sample.

8. The system of claim 1, wherein a given sample includes an image of a body part of a user.

9. The system of claim 1, wherein the one or more hardware processors are further configured by machine-readable instructions to effectuate transmission of an indication that the given sample was obtained from one or more of a false representation of a sample acquired by the sensor, a surrogate feature, or a prosthetic feature, the indication being transmitted responsive to the one or more anti-spoofing checks resulting in a positive determination.

10. The system of claim 1, wherein the request for evidence is received responsive to a request to access a protected resource, the protected resource including one or both of protected information or a protected device.

11. The system of claim 1, further comprising a display apparatus configured to present a transaction identifier to a user.

12. The system of claim 1, wherein the one or more hardware processors are further configured by machine-readable instructions to determine a first quality metric associated with a first sample, the first quality metric including a description of one or more measureable aspects of the first sample.

13. The system of claim 1, wherein the one or more hardware processors are further configured by machine-readable instructions to perform one or more anti-spoofing checks to determine whether a given sample was obtained from one or more of a false representation of a sample acquired by the sensor, a surrogate, or a prosthetic.

14. The system of claim 1, wherein the one or more hardware processors are further configured by machine-readable instructions to provide a digital signature for the signed or encrypted unit of data, the digital signature being associated with a private key.

15. The system of claim 11, wherein the transaction identifier is presented as one or more of an image, an icon, or text.

16. The system of claim 12, wherein the one or more hardware processors are further configured by machine-readable instructions to determine, whether the first sample is to be rejected for inclusion in the evidence based on the first quality metric not breaching a threshold.

17. The system of claim 14, wherein the private key is associated with a public key infrastructure certificate, the public key infrastructure certificate identifying one or more of a manufacturer of the sensor, a vendor of the sensor, a sensor type, a sensor model, a serial number, a security feature, or a security level.

18. A hardware processor-implemented method, the method comprising:
receiving a request for evidence from an external client computing platform, the evidence to include one or more biometric samples or a representation of one or more biometric samples, the request for evidence including a challenge;
obtaining individual ones of one or more biometric samples, the one or more biometric samples being acquired by a sensor, the sensor being communicatively coupled with a client computing platform, the client computing platform being configured to receive the request for evidence;
combining the evidence and a response to the challenge into a signed or encrypted unit of data; wherein combining the evidence and the response to the challenge into the signed or encrypted unit of data includes:
packing the evidence and the response to the challenge into two or more data blocks;
obtaining hashes of the two or more data blocks; and
obtaining another data block that includes the hashes of the two or more data blocks;
and
effectuating transmission of the signed or encrypted unit of data to a server by way of the client computing platform.

19. The method of claim 18, further comprising: performing one or more anti-tampering checks to determine whether the sensor has been tampered with.

20. The method of claim 19, further comprising: effectuating transmission of an indication that the sensor has been tampered with responsive to the one or more anti-tampering checks resulting in a positive determination.

\* \* \* \* \*